Patented Apr. 17, 1934

1,955,296

UNITED STATES PATENT OFFICE 1,955,296

ANTIFREEZE SOLUTION

Frank A. Howard, Elizabeth, N. J., assignor to Standard Oil Development Company, a corporation of Delaware No Drawing. Application January 8, 1931, Serial No. 507,524

2 Claims. (Cl. 252—5)

This invention relates to improvements in mixtures comprising isopropyl alcohol and methyl alcohol, adapted for use to lower the freezing point of cooling water, especially in the radiators of motor vehicles.

In its preferred form, the invention comprises an aqueous solution of a mixture made up of 35% by volume of methyl alcohol and 65% by volume of isopropyl alcohol. The methyl alcohol is preferably the commercial synthetic grade of substantially 100% strength. The isopropyl will ordinarily contain about 91% by volume of the alcohol, the remainder being principally water. This is known as the tank car grade. Other concentrations of methyl and isopropyl alcohol may be used.

The mixture of alcohols is suitably diluted with water. For motor car radiators, a 36% aqueous solution of the mixture is recommended where the temperature does not fall to 0° F. Higher or lower concentrations may be adopted in accordance with the temperature conditions.

Considerable variation in the relative proportions of the two alcohols is permissible. For example, the principal benefits of the invention can be obtained with mixtures of 25 to 45% methyl alcohol by volume and 75 to 55% of isopropyl alcohol, diluted to the proper extent by addition of water.

The compositions described have no objectionable corrosive properties and are well adapted to serve for anti-freeze purposes. The evaporation loss is low. However, for use in automobile radiators and the like, it is desirable to add a small amount of oil to the anti-freeze solution so as to check evaporation. Oxidized oils of the type commonly used in connection with denatured alcohol may be used, but such oils are not necessary with the present invention. Kerosene in the amount of 1 or 2% by volume of the alcohol mixture is satisfactory.

When a 36% aqueous solution of the preferred mixture, namely 35% methyl alcohol and 65% isopropyl alcohol is used, the specific gravity at 60° F. is practically identical with that of denatured ethyl alcohol (94.7% concentration) in the same dilution. The mixture has a freezing point of 0° F., which is the same as that of denatured ethyl alcohol under the same conditions. The volatility of the mixture and of denatured ethyl alcohol are very similar. This substantial identity of the physical properties, which are important for anti-freeze purposes, applies as between the other corresponding concentrations of the alcohols compared. The familiar methods for testing the concentration of denatured alcohol solutions may be applied to the isopropyl-methyl mixture.

In the appended claims, it is my intention to claim all novelty inherent in the invention as broadly as the prior art permits.

I claim:

1. An anti-freeze composition comprising an aqueous solution of isopropyl alcohol and methyl alcohol made up by adding to water a mixture of about 25 to 45% by volume of methyl alcohol with 75 to 55% by volume of isopropyl alcohol, such aqueous solution having approximately the same specific gravity, volatility and freezing point as a solution containing the same percentage of ethyl alcohol.

2. An anti-freeze composition comprising an aqueous solution made up by adding to water a mixture of 35% by volume of methyl alcohol and 65% by volume of isopropyl alcohol, such composition substantially duplicating the specific gravity, volatility and freezing point of an aqueous solution containing the same percentage of ethyl alcohol.

FRANK A. HOWARD.